Aug. 2, 1927.

C. BORNMANN 1,637,513

SAFETY CATCH FOR SHUTTERS

Filed Feb. 18, 1927

INVENTOR
CARL BORNMANN
BY Philip S. Hopkins
ATTORNEY

Patented Aug. 2, 1927.

1,637,513

UNITED STATES PATENT OFFICE.

CARL BORNMANN, OF BINGHAMTON, NEW YORK, ASSIGNOR TO ANSCO PHOTOPRODUCTS, INC., OF BINGHAMTON, NEW YORK.

SAFETY CATCH FOR SHUTTERS.

Application filed February 18, 1927. Serial No. 169,385.

In photographic shutters, there is usually provided an operating lever or finger piece projecting from the shutter, and in the case of a camera wherein the shutter is enclosed within a box or casing, projecting through such casing for manipulation from the outside. The disadvantage of such a construction is that this projecting operating lever is very apt to engage with some extraneous object as the camera is carried along, or catch on a pocket or some portion of the user's garment as it is being moved from one position to another, resulting often in the snapping of the shutter unintentionally and frequently without the operator being aware of the fact. Such an incident results in the operator making a double exposure on that section of film in line with the lens and shutter and thereby spoiling his picture.

In order to prevent such accidental movement of the operating lever and yet without interfering with the quick and easy manipulation thereof, I have provided a means for normally retaining the lever locked against accidental movement, but which without unnecessary delay or troublesome adjustment, may be operated in the usual manner to make an exposure.

These as well as other objects and advantages by way of detail will be more apparent and obvious as the description proceeds, reference now being had to the figures of the accompanying drawing wherein like reference numerals indicate like parts.

In the drawing:—

Figure 1:
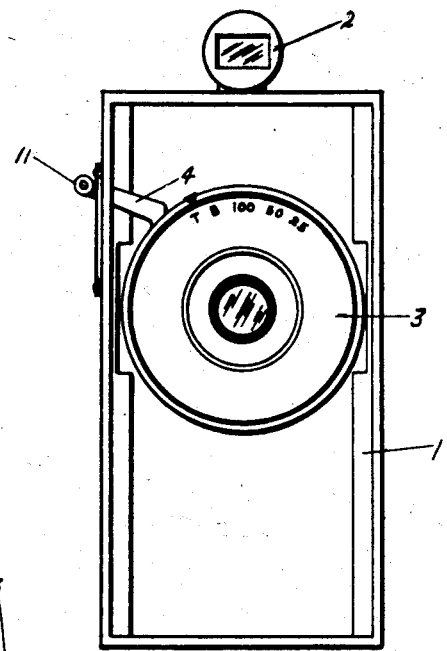
Figure 1 is a front view of a camera provided with my invention, the front plate being removed for clearness of illustration.

The reference numeral 1 refers to a camera box enclosing the usual film or plate holder (not shown), and provided with the view finder 2. A shutter 3 is mounted within the camera and provided with the operating lever or finger piece 4 extending outwardly through the wall of the camera, the wall being recessed or slotted for this purpose.

Secured to the side wall of the camera at this point is a plate 5 also slotted as at 6 to receive the projecting end of the shutter lever, such plate being secured to the wall of the camera as by the pins, screws, or rivets 7.

Figure 2:
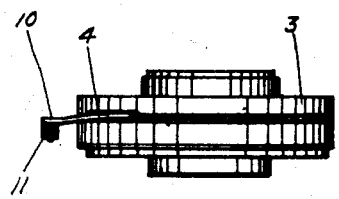
Figure 2 is a side view of the camera illustrating clearly my improved safety device.
Figure 3:
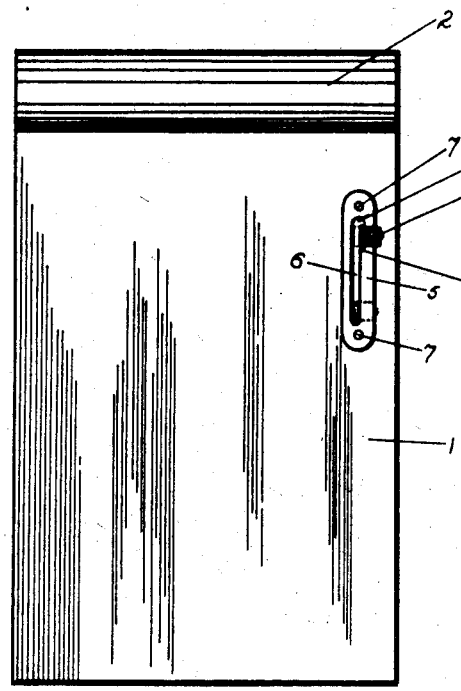
Figure 3 is a detail plan view of a shutter and operating lever such as may be used with my invention.

It will be noted with reference to figure 2 that the upper end of the slot 6 in the plate 5 is slightly enlarged as at 8, this enlarged portion forming at its lower end a shoulder 9 above which the operating lever 5 normally lies. This operating lever 4, preferably of spring metal to lend resilience thereto, has the outer end thereof slightly offset as at 10 whereby to normally directly overlie the shoulder 9 of the plate 5. The extreme free end of the shutter lever 4 is provided with the knurled finger grip 11.

It will be readily seen that with the shutter lever in the normal position shown in Figure 2, there is little likelihood of it being accidentally moved downwardly to snap the shutter through accidental catching on something. When the operator desires to make an exposure, however, he merely presses the lever to the left in Figure 2, enough to bring the same free of the shoulder 9, whereupon the lever may be depressed within the slot 6 to operate the shutter. Upon the return of the lever 4 to normal position and release by the operator, the resiliency thereof will cause it to automatically assume its "safety position" above the shoulder 9.

Although this safety device has been illustrated in connection with one type of shutter and shutter lever only, it will be clear to those skilled in the art that the same is readily applicable to other types and forms of shutters than that shown. It will also be understood that changes may be made in details of construction and arrangement of parts without departing from the spirit and scope of my invention. I do not limit myself therefore to the exact structure shown and described, other than by the appended claims.

I claim:—

1. In combination with a camera, a shutter, an operating lever for said shutter, and a safety catch for said lever.

2. In combination with a camera, a shutter, an operating lever for said shutter, and a safety catch for said lever comprising a fixed shoulder in the normal path of movement of said lever.

3. In combination with a camera, a shutter, an operating lever for said shutter, a recess in said camera through which said lever extends, and a fixed shoulder in said recess in the normal path of movement of said lever.

4. In combination with a camera, a shutter, an operating lever for said shutter projecting through said camera, a recessed plate on said camera through which said lever extends, said recess being restricted for a portion of its length to form a safety catch for said lever.

5. In combination with a camera, a shutter, an operating lever for said shutter projecting through a wall of said camera, a recessed plate on said camera through which said lever extends, a fixed shoulder on said plate lying in the normal path of said lever in said recess.

6. In combination with a camera, a shutter, an operating lever for said shutter projecting through a wall of said camera, a recessed plate on said camera through which said lever extends, a fixed shoulder on said plate lying in the normal path of said lever in said recess, said lever being offset whereby a portion thereof normally engages said shoulder.

7. In combination with a camera, a shutter, an operating lever for said shutter projecting through a wall of said camera, a recessed plate on said camera through which said lever extends, a fixed shoulder on said plate lying in the normal path of said lever in said recess, said lever being offset whereby a portion thereof normally engages said shoulder, and said lever being resilient whereby it may be disengaged from said shoulder and moved in said recess to operate said shutter.

CARL BORNMANN.